3,431,945
PLUMBER'S PNEUMATIC PLUG
Hubert A. Robillard, 2384 17th St.,
Wyandotte, Mich. 48192
Filed May 23, 1966, Ser. No. 552,217
U.S. Cl. 138—90                              1 Claim
Int. Cl. F16l 55/12

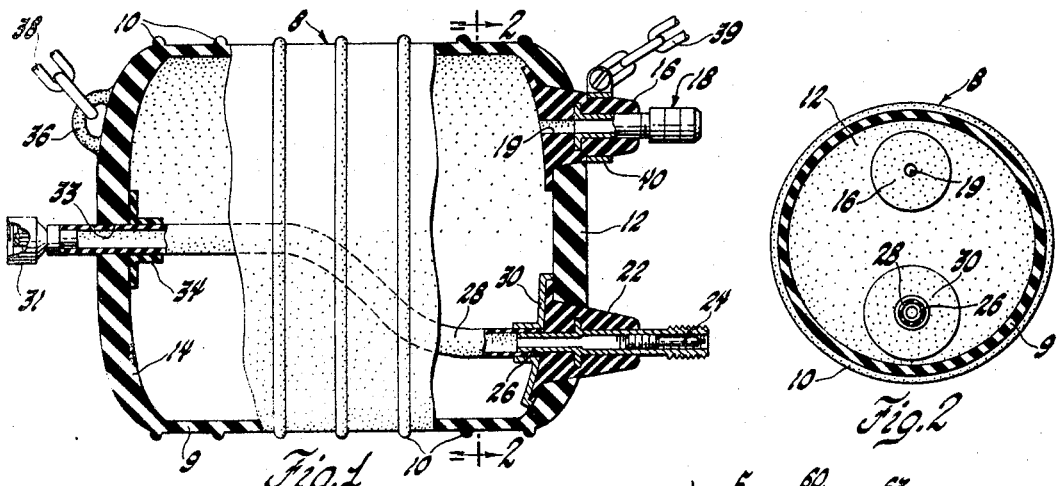
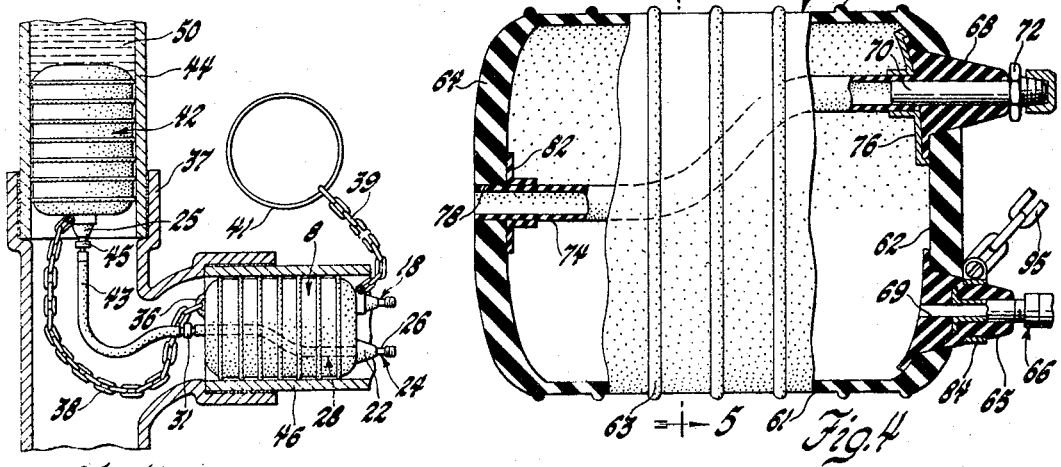
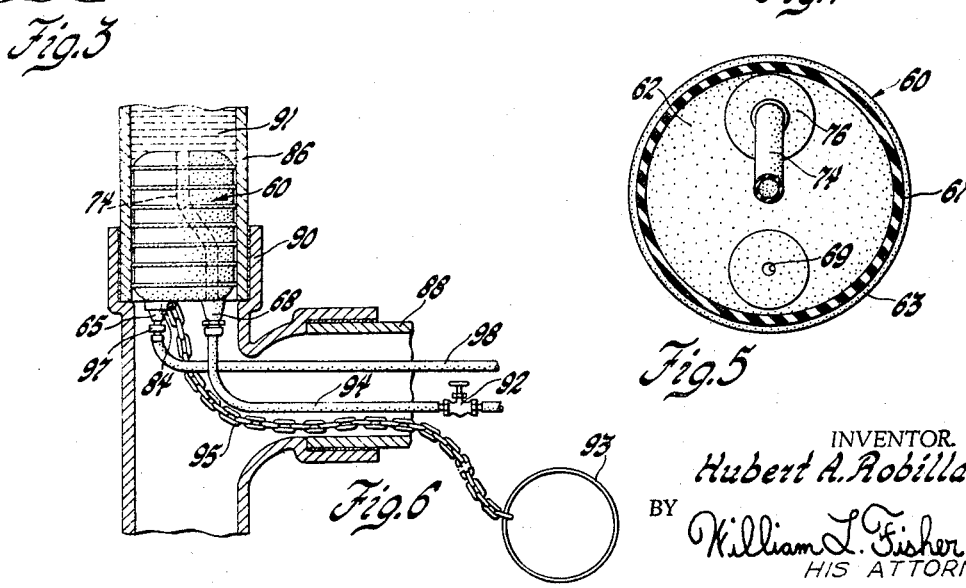

ABSTRACT OF THE DISCLOSURE

A plumber's pneumatic pipe plug is disclosed comprising hollow inflatable and deflatable conduit seal means having a rubber body and rubber end caps joined to said body, the body being stretchable and the end caps being non-stretchable in relation to said body, a first rubber boss mounted in one of said end caps and projecting outwardly thereof, a through aperture in said first boss and an air valve mounted therein, a second rubber boss mounted in said one end cap and projecting outwardly thereof, a through aperture in said second boss and pipe means mounted therein, said pipe means extending through said second boss and having its inner end disposed in the interior of said pipe plug, a flexible conduit disposed in the hollow interior of said pipe plug and having one end thereof connected to said pipe means inner end, the other end of said flexible conduit extending through the other of said end caps, said flexible conduit being longer than the axial distance between said end caps, said air valve serving to inflate and deflate said pipe plug, said pipe means and said flexible conduit serving to pass fluid through the end caps of said pipe plug and through the hollow interior thereof.

---

My invention relates to the plumbing art.

Its principal object is the provision of improved means and methods for sealing off plumbing systems for making repairs or alterations thereto and for testing and locating water and gas leaks therein.

The foregoing object of my invention and its advantages will appear during the course of the foregoing description, taken in conjunction with the accompanying drawings, in which:

FIG. 1 is a side elevational view with parts in section of a pneumatic pipe plug embodying my invention;

FIG. 2 is a transverse sectional view of the structure of FIG. 1 taken on the line 2—2 thereof;

FIG. 3 is a vertical sectional view of a portion of a plumbing system showing uses of said embodiment;

FIG. 4 is a side elevational view with parts in section of another pneumatic pipe plug embodying my invention;

FIG. 5 is a transverse sectional view of the structure of FIG. 4 taken along the line 5—5 thereof; and FIG. 6 is a vertical sectional view of a portion of a plumbing system showing uses of said other embodiment.

Referring to the drawings in greater detail and particularly to FIGS. 1–3, 8 designates an inflatable pipe plug comprising a member 9 of cylindrical shape and stretchable material, preferably of rubber, with integral ribs 10 in relief and circling its circumference. The pipe plug 8 also comprises end caps 12 and 14 which are joined to the member 9 and are of thick walled construction preferably of rubber. A boss 16 which has a rear flange as shown is joined to the end cap 12, preferably by vulcanizing, and forms a mounting for an air valve 18. The boss 16 has an aperture 19 in alignment with the air valve 18. The air valve 18 is of conventional construction having a removeable core comprising a spring biased valve stem and seat. A valve cap is shown on the valve body of the valve 18. The valve 18 opens to permit the passage of air whenever the valve stem is depressed, e.g., when an air pump hose equipped with a conventional swivel nut with female threads and a valve stem actuator in its center is connected to the valve 18 to depress its valve stem for inflating the pipe plug 8. The valve 18 closes whenever the valve stem is released, e.g., when said swivel nut is unthreaded from the valve 18. Whenever the valve stem is depressed (or the valve core is removed from the valve body) when the pipe plug 8 is inflated air under pressure within the pipe plug 8 will be released from the latter. A boss 22 like the boss 16 is similarly joined to the end cap 12 and forms a mounting for another air valve 24 of the same type described. The valve 24 has a rear extension 26 on its valve body which extends through the end cap 12 into the interior of the pipe plug in sufficient length to attach an air hose 28 thereto in an air-tight manner, e.g., the rear extension 26 is inserted into an end of the air hose 28 which is vulcanized to a flange 30. The flange 30 in turn is vulcanized to the rear flange of the boss 22 and to the end cap 12. The interior air hose 28 extends longitudinally between the extension 26 and the end cap 14 through which the interior hose 28 protrudes. The interior air hose 28 is longer than the maximum distance between the end caps 12 and 14 in the expanded condition of the pipe plug 8 and preferably is made extra long as shown to eliminate any possibility of tension on it when the pipe plug 8 is expanded. The interior hose 28 is secured to the end cap 14 in an air tight manner as by vulcanizing. To insure an air tight seal the interior hose 28 is also vulcanized to a flange 34 which in turn is vulcanized to the inner face of the end cap 14. The interior hose 28 extends externally of the end cap 14 and its external end carries a conventional air connection swivel nut 31 as described above. A heavy rubber loop 36 is formed, as by vulcanizing, on the end cap 14 as an anchor for a save line, e.g., a chain 38. A similar save line 39 may be affixed to the pipe plug 8 via a band 40 on the boss 16. The save line 39 is also affixed to a retaining ring 41 of greater diameter than the pipe in which the pipe plug 8 is used.

In FIG. 3 is shown a portion of a plumbing system comprising a stack pipe leading to a sewer (not shown) and consisting of a vertical pipe 44 connected by a T-joint 37 to which is also connected a horizontal pipe 46 in the instance. An extension air hose 43 is connected, via its male end, to the swivel nut 31 and via its female end which carries a swivel nut 45 to an air valve (not shown) mounted on a boss 25 on the end cap of a pipe plug 42. The pipe plug 42 is inflated via the air valve (not shown) in the boss 25 which air valve (not shown) is opened so long as the swivel nut 45 is threadably engaged fully on such air valve (not shown). A save line, e.g., a chain 38, is connected to the boss 25 and to the anchor loop 36. The pipe plug 42 is inserted into the stack pipe and placed in position in the pipe 44 and inflated in sealing relationship thereto by opening the valve 24 and pumping air through the interior hose 28, the extension hose 43 and the air valve (not shown) of the pipe plug 42 and into the interior of the latter. The pipe plug 8 is inserted into position in the pipe 46 and is inflated in sealing relationship thereto by opening the valve 18 and pumping air into the interior of the pipe plug 8. The pipe plug 42 plugs off the stack pipe by plugging the pipe 44 and retains water 50 above it so that a water test can be made on one floor rather than subjecting the entire stack to a larger head of pressure than one floor. For example, a fourth floor can be water tested without filling the stack from the first floor. Upon completion of the water test the pipe plug 42 is deflated by depression of the valve stem of the air valve 24 via air released through the open valve (not shown) of the pipe plug 42, the extension hose 43, the interior hose 28 and the open valve 24. By sealing the pipe 46 the pipe plug 8 prevents flooding, such as of the fourth floor mentioned, when the water 50 is released upon deflation of the pipe plug 42. This prevents any damage to the ceiling of the third floor or other structure below the fourth floor. The save line 39 prevents loss of the deflated pipe plug 42 as from rupture of the air hose 43. Following deflation of the pipe plug 42 and the release of the water 50 the pipe plug 8 is deflated by depression of the valve stem of the air valve 18. The bosses 22 and 16 are preferably formed of differently colored rubber to distinguish the valves 18 and 24 from each other so that in an arrangement such as shown in FIG. 3 the valve stem of the valve 18 will not be depressed prior to that of the valve 24. The save line 39 and retaining ring 41 prevent loss of the deflated pipe plugs 8 and 42 as from the entire assembly falling down the interior of the stack.

Referring to FIGS. 4–6, 60 designates an inflatable pipe plug comprising a member 61 of cylindrical shape and stretchable material, preferably rubber, with integral ribs in relief and circling its circumference. The pipe plug 60 also comprises end caps 62 and 64 which are joined to the member 61 and of thick walled construction, preferably of rubber. A boss 65 like the boss 16 is joined to the end cap 62, preferably by vulcanizing, and forms a mounting for an air valve 66. The boss 65 has an aperture 69 in alignment with the air valve 66. The air valve 66 is of conventional construction having a removable core comprising a spring biased valve stem and seat as described in conjunction with the air valve 18. A pipe section 70 is vulcanized to a boss 68 which has a rear flange as shown and which is vulcanized to the end cap 62. The outer end of the pipe section 70 is provided with pipe threads and a wrench hold 72 in the form of an hexagonal nut in the instance. The pipe section 70 extends into the interior of the pipe plug 60 in sufficient length to attach to a water hose 74 in an air and water tight manner, e.g., the rear end of the pipe section 70 is inserted into an end of the water hose 74 which is vulcanized to a flange 76. The flange 76 in turn is vulcanized to the rear flange of the boss 68 and to the end cap 62. The interior hose 74 extends longitudinally between the pipe section 70 and the end cap 64 to which it is secured in an air and water tight manner as by vulcanizing. To insure an air and water tight seal the interior hose 74 is also vulcanized to a flange 82 which in turn is vulcanized to the end cap 64. The interior water hose 74 is of extra length as described for the air hose 28. The interior hose 74 is flush with the outside wall of the end cap 64. The boss 65 on the pipe plug 60 is provided with a band 84 to which may be affixed a save line 95.

In FIG. 6 is shown a portion of a plumbing system comprising a stack pipe leading to a sewer (not shown) and consisting of a vertical pipe 86 connected by a T-joint 90 to which is also connected a horizontal pipe 88 in the instance. A water valve is connected to the pipe section 70 either directly or as shown in FIG. 6 for the valve 92 by an extension water hose 94. An extension air hose 98 carrying a swivel nut 97, as before described, may be connected to the air valve 66. The pipe plug 60 is inflated via the extension air hose 98 and the air valve 66 which is opened so long as the swivel nut 97 is threadedably engaged fully on such air valve. A save line, e.g., a chain 95, is connected to the anchor loop 84 and to a retaining ring 93. The pipe plug 60 is inserted into the stack pipe and placed in position in the pipe 86 and inflated in sealing relationship thereto by pumping air through the air hose 98 and the open air valve 66 into the interior of the pipe plug 60. Water or other liquid may be pumped into the upper pipe 86 through the interior water hose 74 via the water valve 92 and the extension water hose 94 for water testing the plumbing system above the pipe plug 60. The liquid 91 which is retained above the pipe plug 60 may be drained under control of the valve 92. The pipe lug 60 is deflated by depression of the valve stem of the air valve 66 (or by removal of its core). The save line 95 and retaining ring 93 prevent loss of the pipe plug 60 as from falling down the interior of the stack pipe. With the pipe plug 60 inflated in place in the pipe 86 and with the liquid 91 drained the water valve 92 may be removed and air pumped through the extension hose 94 and the interior hose 74 into the pipe 86 for testing purposes, e.g., to test the plumbing system, including the water traps thereof, above the pipe plug 60 for air leaks. A static head of air is maintained unless there is leakage in the portion of the plumbing system under test in which case the static head of air gradually falls. Location of the leakage may be determined with the pipe plug 60 inflated in place as for the static air test by passing an oderiferous volatile substance, such as smoke or peppermint oil, through the extension hose 94, the interior hose 74 and into the pipe 86 above the pipe plug 60. Wherever the odor of such substance can be detected the air tightness of the area is investigated.

It will thus be seen that there has been provided by the present invention improvements in the plumbing art in which the object hereinabove set forth, together with many other thoroughly practical advantages, has been successfully achieved. While preferred embodiments of the invention have been shown and described it is to be understood that variations and changes may be resorted to without departing from the spirit of the invention as defined by the appended claims.

What is claimed is:

1. A plumber's pneumatic pipe plug comprising hollow inflatable and deflatable conduit seal means having a rubber body and rubber end caps joined to said body, the body being stretchable and the end caps being non-stretchable in relation to said body, a first rubber boss mounted in one of said end caps and projecting outwardly thereof, a through aperture in said first boss and an air valve mounted therein, a second rubber boss mounted in said one end cap and projecting outwardly thereof, a through aperture in said second boss and pipe means mounted therein, said pipe means extending through said second boss and having its inner end disposed in the interior of said pipe plug, a flexible conduit disposed in the hollow interior of said pipe plug and having one end thereof connected to said pipe means inner end, the other end of said flexible conduit extending through the other of said end caps, the portion of said flexible conduit between said end caps being longer than the axial distance between said end caps in the inflated condition of said pipe plug, said air valve serving to inflate and deflate said pipe plug, said pipe means and said flexible conduit serving to pass fluid through the ends caps of said pipe plug and through the hollow interior thereof.

References Cited

UNITED STATES PATENTS

| 3,091,259 | 5/1963 | Alessio | 138—90 |
| 1,221,733 | 4/1917 | Henderson | 138—90 |
| 1,993,387 | 3/1935 | Nicholson | 138—89 |
| 2,279,257 | 4/1942 | Svirsky | 138—93 |
| 2,299,116 | 10/1942 | Svirsky | 138—90 |
| 3,241,571 | 3/1966 | Garcia | 138—90 |

LAVERNE D. GEIGER, *Primary Examiner.*

BRADFORD KILE, *Assistant Examiner.*